C. H. REID.
MOTOR.
APPLICATION FILED NOV. 26, 1918.
1,433,037.
Patented Oct. 24, 1922.
3 SHEETS—SHEET 1.
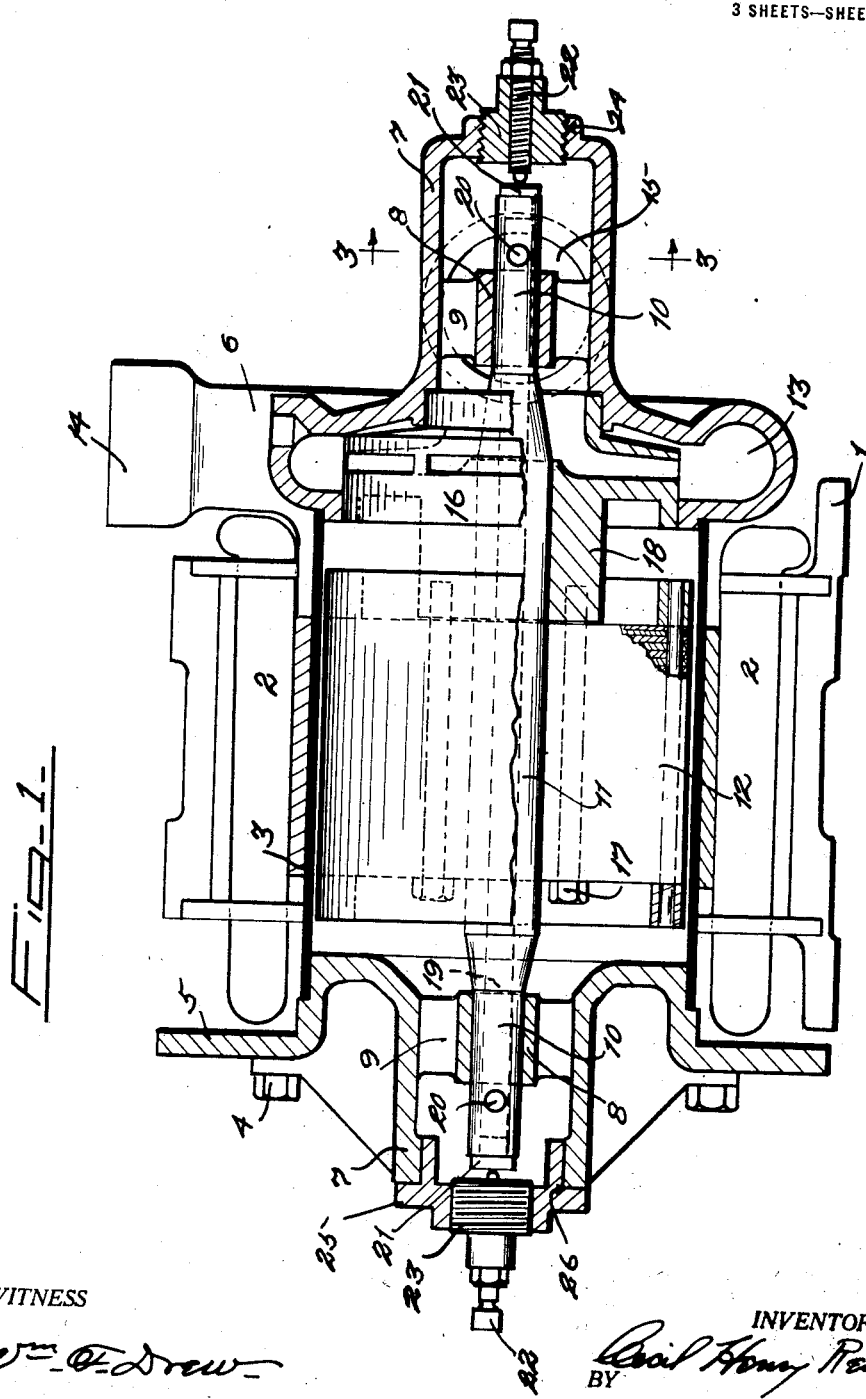

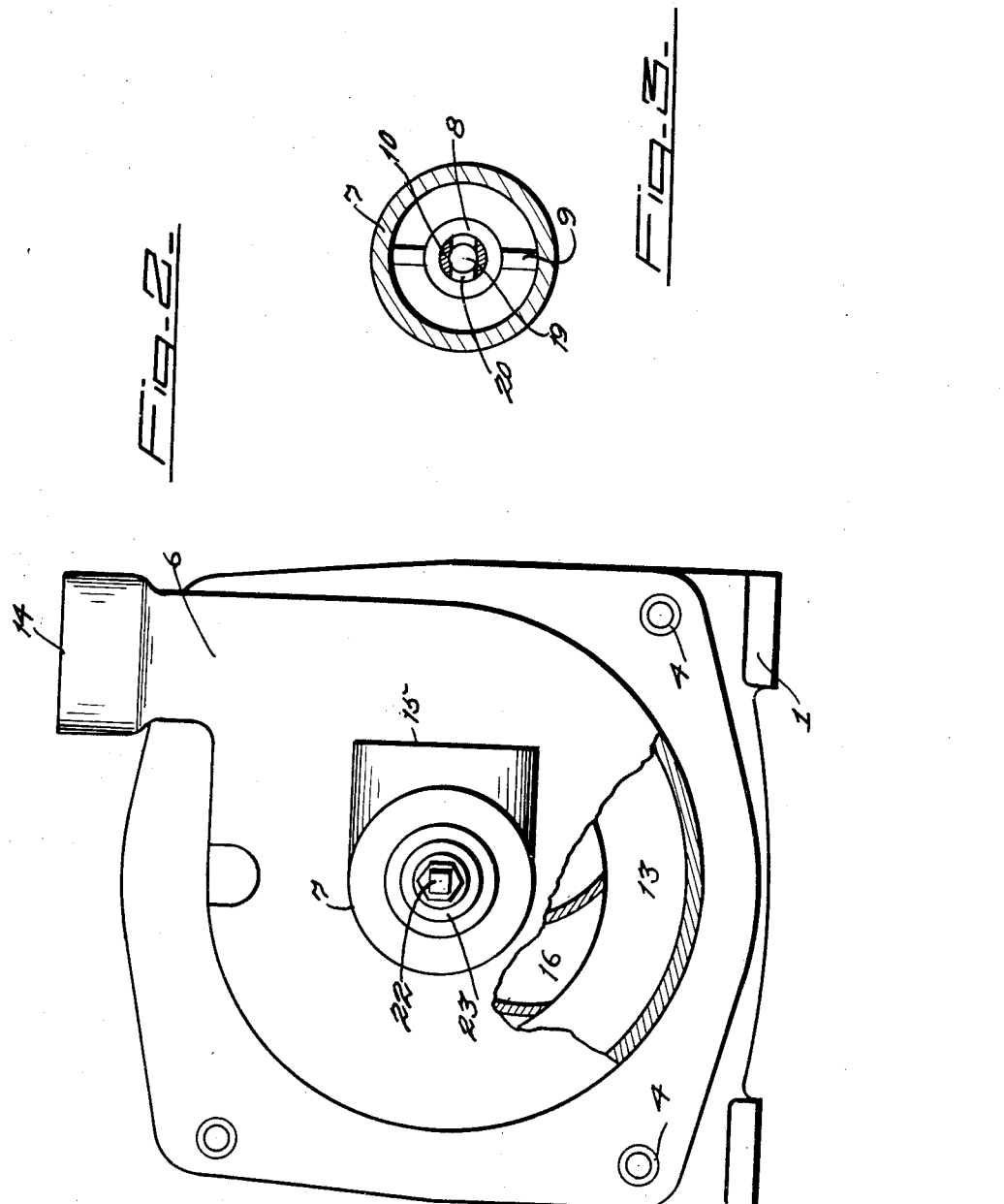

C. H. REID.
MOTOR.
APPLICATION FILED NOV. 26, 1918.

1,433,037.

Patented Oct. 24, 1922.
3 SHEETS—SHEET 3.

WITNESS

INVENTOR
Cecil Henry Reid
BY
Acker & Totten
ATTORNEYS

Patented Oct. 24, 1922.

1,433,037

UNITED STATES PATENT OFFICE.

CECIL HENRY REID, OF SOMERSET WEST, SOUTH AFRICA.

MOTOR.

Application filed November 26, 1918. Serial No. 264,143.

*To all whom it may concern:*

Be it known that I, CECIL HENRY REID, a subject of the King of England, resident of Somerset West, South Africa, have invented certain new and useful Improvements in Motors, of which the following is a specification.

Direct connected electrically operated pumps untilized in the pumping of water, oil and such other liquids or air and non-corrosive gases, employ a gland or packing surrounding the spindle and use a suitable lubricant in connection therewith to reduce wear on the spindle or rod. However, in the pumping of corrosive liquids with this type of apparatus, such as acids and alkali solutions, the pumped liquid acts on the lubricant in such manner as to render the same, in most cases, more harmful than useful in reducing the wear on the spindle. In pumping acids of the type used in the manufacture of explosives the same can be satisfactorily accomplished as long as moisture carrying air is excluded from contact with the gland or bearing, and this is usually accomplished by tightly compressing the packing about the spindle, which adjustment has numerous disadvantages in that the spindle is generally cut or scored very rapidly by the friction of the packing thereon. If the packing is not tightly adjusted, a slight leakage around the spindle takes place, which permits the acid to pick up the moisture from the incoming air, which forms a weak acid around the spindle nearest to the gland, the action of which rapidly cuts away the metal of the spindle, requiring replacement thereof. Thus, in the present constructions the gland and the lubrication thereof reduces to a marked degree the life of an apparatus of the described type when employed in an acid plant or the like.

The principal object of the present invention is to provide a construction wherein the packing or glands about the spindle, and in fact all packings, or glands are entirely eliminated and wherein the pump runner and motor rotor are enclosed and operate within a fluid tight casing or chamber and the bearings of the supporting spindle for said rotor and runner are lubricated by the fluid pumped, thereby overcoming all liability of the bearings or spindle being cut or rendered useless due to the admission of air around the bearing, and overcoming the liability of leakage of the pumped fluid from the chamber. Another and important object is to provide a construction wherein the pump runner is directly connected in close proximity to the motor rotor, eliminating transmissions employed when the pump and motor are separate units, and providing a construction which is capable of installation within a small space. A further object is to provide a construction wherein the stator of the motor is lined with a cylindrical sheath which together with the end plates provides a simple construction for forming a fluid tight chamber within which the motor rotor operates in silence due to the surrounding of the same in liquid. A further object is to provide a means for maintaining a circulation of the fluid pumped within the chamber, insuring perfect lubrication of all bearing surfaces of the spindle.

With the above mentioned and other objects in view, the invention consists in the novel construction and combination of parts hereinafter described, illustrated in the accompanying drawings and pointed out in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein, Fig. 1 is a view in vertical section of the preferred embodiment of my invention.

Fig. 2 is a view in end elevation.

Fig. 3 is a vertical sectional view taken on line 3—3 of Fig. 1.

Figure 4:
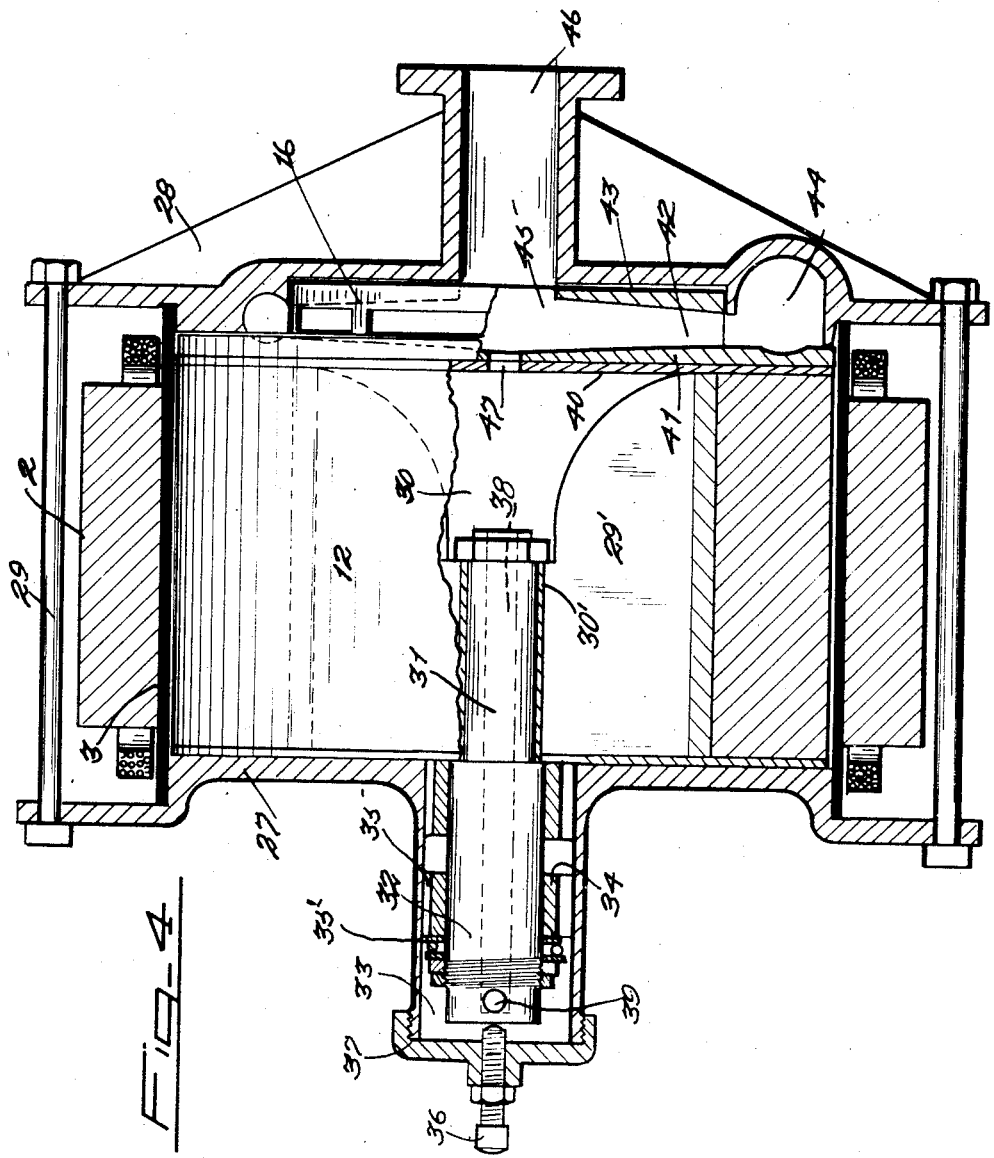
Fig. 4 is a vertical sectional view of a modified form of construction wherein the pump runner is of the overhung type.

Referring more particularly to the drawings, wherein like characters of reference designate corresponding parts, 1 indicates a suitable motor base carrying the wound stator 2 of an induction motor, the windings of which are preferably protected from corrosion by varnish or other suitable material, and are connected to a source of electric power, the form of said stator being preferably cylindrical. Within the bore or interior of said stator 2 is positioned, in any suitable manner, a relatively thin sheath 3, of suitable construction and substance, preferably insulating material, the ends of the same extending to a point substantially flush with the ends of the windings of the stator 2, as in the drawings. Fitted over the opposite ends of the sheath 3 and maintained in position to close the same by the bolts 4 are the end plates 5 and 6 which with the sheath form a fluid tight chamber within the stator 2. Each of said end plates is provided with the cylindrical portion 7, in which are mounted, in any suitable manner, the spindle bearings 8, said bearings being supported by spiders 9 connected with the interior wall surface of the member 7. The bearings 8 are arranged at opposite ends of the longitudinal center of said sheath 3 and within the same are received the opposite reduced ends 10 of the spindle 11 which carries the motor rotor 12 of any suitable construction, and which is positioned within the sheath 3 between the inner faces of the end members 5 and 6 and with its periphery in slight spaced relation to the inner wall surface of the sheath 3. The end member 6 has formed therein a volute 13 having a discharge 14, and the fluid passing therethrough being admitted through an opening 15 in the extension 7 of the end plate 6.

Within the volute 13 rotates a suitable pump runner 16 of any well known construction, the same being carried by the spindle 11, in any suitable manner, bolts 17 being illustrated as connecting the hub 18 of the runner to the motor rotor 12. A running joint is provided between the outer surface of the runner 16 and the inner wall surface of the volute 13, no attempt being made to entirely exclude the fluid being pumped from passing between the surfaces forming said running joints, as it is desired that the volute communicate with and form a part of the fluid tight chamber.

The spindle 11 is formed throughout its length with an axial bore 10 provided at its opposite ends at points beyond the bearings 8 with lateral openings 20, the opposite ends of said bore being closed by the caps or members 21 against which contact the adjustable thrust absorbing members or screws 22 each carried by a removable plug 23, one of which threads directly into an opening 24 formed at the end of the extension 7 of the end plate 6 and the other of which is received in a closure member 25 which is removably seated in an opening 26 in the extension 7 of the end plate 5.

The modified construction is substantially the same as the preferred embodiment, with the exception that the motor rotor and pump runner are overhung and the bearing at one end of the spindle is eliminated, which permits of the building of the device capable of installation in a space slightly less than that required for the installation of the preferred embodiment.

In the modified construction the stator 2 and sheath 3 are of the same construction and formation as in the preferred embodiment and end plates 27 and 28 are employed and are maintained in position over the opposite ends of the sheath 3 by the bolts 29 which draw said end plates tightly in contact with the ends of the sheath, providing a fluid-tight chamber within which is positioned the motor rotor 12 of a construction similar to that of the preferred embodiment.

In the modified construction the motor rotor is formed with the supporting webs or spiders 29', which at one side adjacent the end plate 28 are cut away forming a conical recess 30 terminating approximately in the center of the rotor, the solid portion or hub 30' of said rotor from which the webs 29' radiate receiving the reduced end 31 of a supporting spindle 32. The end of the spindle 32 extends into a depression or cylindrical recess 33 in the end plate 27 and is rotatably supported by a bearing 34 carried by a spider 35. The thrust in one direction on the spindle 32 is absorbed by the thrust bearing 35' within the extension 33 and an adjustable screw member 36 carried by a closure cap 37 over the end of the extension 33 limits the longitudinal movement in an opposite direction of the spindle. As in the preferred embodiment, the spindle is provided with the longitudinal bore or channel 38, the outer end of which opens directly into the conical recess 30 at the outer end of the hub 30' and the inner end of which terminates in a lateral port 39 opening into the cylinder extension 33 surrounding the spindle 32.

The outer end of the rotor 12 carries a plate 40 and to the same is secured the wall member 41 of a pump runner 42 which operates with a running fit within a recess 43 in the inner face of the end plate 28, said recess being surrounded by the usual pump volute 44 of any well known construction. The runner is provided with the fluid inlet opening 45 which communicates with a corresponding opening 46 in the end member 28 which is connected to any suitable fluid supply, and in alignment with said openings 45 and 46 the plate 40 and wall member 41 are provided with aligned openings 47, which are in alignment with the bore 38 in the spindle 31, which openings 47 permit of a circulation of fluid through the spindle 32 during the operation of the device.

As in the preferred embodiment the volute 44 is within the limits of the fluid tight chamber formed by the shell and end plates.

From the above description of the present apparatus, it will be apparent that by enclosing the motor rotor and its operated element within a fluid tight chamber the entire elimination of glands and packings is obtained and by this construction all transmissions connecting the motor rotor and operated element are eliminated. The positioning of the motor rotor within a fluid body and which is under a slight pressure during its operation renders the operation of the motor rotor and its operated elements noiseless. The maintenance of a circulation of the fluid being operated upon around the bearing and motor rotor insures the lubrication of the rotor bearings and the maintaining at a low temperature of the motor, thus insuring the lubrication of all wearing parts as long as the pumping of the fluid is maintained and dispensing with the necessity of an attendant or engineer to periodically lubricate the friction surfaces which is required in all constructions of the gland type.

While the illustration discloses an alternating current motor it is to be understood that the invention may be equally as well employed in connection with any type of electro-dynamic machine, the essence of the invention being to enclose the moving element within a fluid containing chamber and within which said element operates.

Having thus described my invention what is claimed as new and desired to be protected by Letters Patent of the United States is:

1. A motor including a stator and a rotor, a shell separating said stator and rotor and for enclosing and providing a chamber within which said rotor operates, said shell provided at one end with a volute formed with a fluid inlet and outlet passage, a runner within the volute and associated with and operated by the rotor for maintaining a circulation of fluid in a fixed path under pressure through said passages and for maintaining a fluid pressure within said shell and surrounding said rotor.

2. A motor including a stator and a rotor, a shell within said stator, end plates for closing the opposite ends of said shell and with said shell providing a chamber for enclosing the rotor and within which the same operates, a supporting spindle associated with the rotor and rotatably mounted in a bearing within one of said end plates, one of said end plates being provided with a fluid inlet and outlet passage, and means directly connected with said rotor and positioned within said chamber and enclosed thereby for maintaining a fluid circulation through said passages and around said rotor.

3. A motor including a stator and a rotor, a shell within said stator, end plates for closing the opposite ends of said shell and with said shell providing a chamber within the stator for enclosing the rotor and within which the same operates, a spindle within the chamber for rotatably supporting the rotor, one of said end plates provided with a fluid inlet and outlet passages and formed with a pump volute, and a pump rotor enclosed in the said chamber and operated by said motor rotor for maintaining a fluid circulation through said passages, said spindle lying within said chamber thereby overcoming the necessity of glands to prevent the leakage of air into the chamber around the same.

4. A dynamo electric machine including a stator and a rotor, a wall forming a chamber within which the rotor operates and separating the rotor and stator, whereby the stator is insulated from the liquid pumped, said chamber provided with a liquid inlet and a liquid outlet, bearings at opposite ends of the chamber, a spindle mounting the rotor and supported in said bearings, and a pump wheel carried by the spindle for pumping liquid through said chamber and for maintaining a circulation of the pumped liquid around said bearings affording a lubricant therefor.

5. A dynamo electric machine including a stator and a rotor, a wall forming a chamber enclosing the rotor and within which the same rotates, said chamber provided at one end with fluid inlet and outlet passages, a spindle within the chamber mounting the rotor, a bearing within the casing for supporting the spindle, and a pump wheel within the end of the casing provided with a liquid passage and mounted on said spindle for pumping liquid through said chamber and for maintaining a circulation of the same around said bearing.

6. A dynamo electric machine including a stator and a rotor, a wall forming a chamber enclosing the rotor and including a sheath of insulating material separating the stator and rotor, a spindle wholly within the chamber for rotatably supporting the rotor, bearings wholly within the chamber for supporting the spindle, said chamber provided with a fluid inlet and a fluid outlet, and a pump wheel within the chamber for maintaining a fluid circulation through said passages and around said bearings.

7. A dynamo electric machine including a stator and a rotor, a wall forming a chamber enclosing the rotor and in which the rotor operates, a spindle within the chamber for rotatably supporting the rotor, said casing provided with fluid inlet and outlet passages and a pump casing, a bearing for the spindle within the chamber, and a pump wheel within said casing for maintaining a liquid circulation through said passages and around said bearing for lubricating the same, said spindle lying wholly within said chamber, overcoming the necessity of glands to prevent the leakage of air into the chamber around the same.

In testimony whereof I have signed my name to this specification in the presence of two subscribing witnesses.

CECIL HENRY REID.

Witnesses:
HARRY A. TOTTEN,
D. B. RICHARDS.